(No Model.)

L. S. FLATAU.
GARDEN TILE.

No. 342,690. Patented May 25, 1886.

WITNESSES:
F. McArdle.
C. Sedgwick

INVENTOR:
L. S. Flatau
BY Munn & Co
ATTORNEYS.

UNITED STATES PATENT OFFICE.

LOUIS S. FLATAU, OF PITTSBURG, TEXAS.

GARDEN-TILE.

SPECIFICATION forming part of Letters Patent No. 342,690, dated May 25, 1886.

Application filed November 27, 1885. Serial No. 184,099. (No model.)

*To all whom it may concern:*

Be it known that I, LOUIS S. FLATAU, of Pittsburg, in the county of Camp and State of Texas, have invented a new and Improved Garden-Tile, of which the following is a full, clear, and exact description.

The object of my invention is to provide a new and improved garden-tile which can be used as a plant-protector or as a curbing for walks, &c.

The invention consists in a tile having a semicircular or U-shaped cross-section and open at the bottom and provided on its top with one or more necks through which the plants can grow.

Reference is to be had to the accompanying drawings, forming part of this specification, in which similar letters of reference indicate corresponding parts in both the figures.

Figure 1:
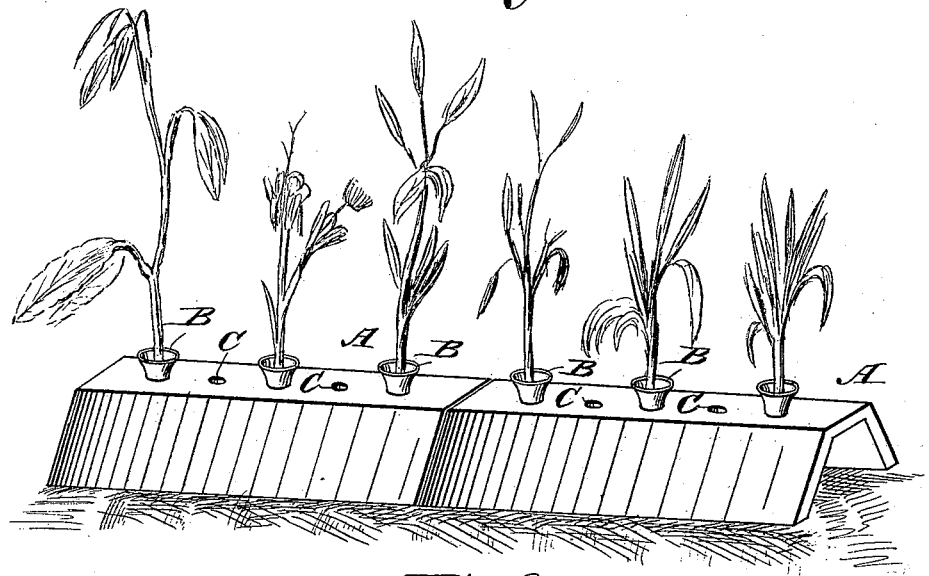
Figure 2:
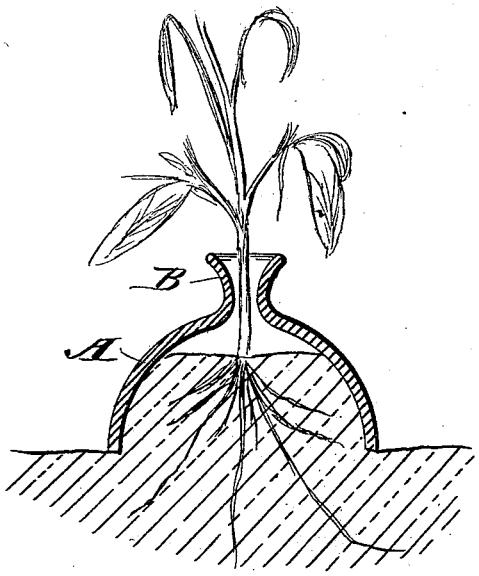

Figure 1 is a perspective view of my new and improved garden-tile, showing the manner of using it as a plant-protector. Fig. 2 is a cross-sectional elevation of a different construction.

The tile A is made of ordinary potter's clay, and is either semicircular or U-shaped, with inclined shanks in cross-section, and can be made in length of from two to three feet, as shown in Fig. 1, or it may be made circular, as shown in Fig. 2.

The tile is provided with a single flaring or bell-shaped neck, B, as shown in Fig. 2, or with a series of necks B. The necks B project more or less from the tops of the tiles and serve as funnels for conducting water or a solution or mixture of fertilizer and water to the plants and roots.

Air-holes C are produced in the top of the tile (shown in Fig. 1) between the funnels or necks, and through said holes sticks or poles are passed, up which the plants grow—for instance, bean-poles, pea-bushes, &c. The seeds or plants are planted in such a manner that they are directly below the necks and can grow up through the said necks, as shown.

The tiles protect the plants from night frosts and from the intense heat of the sun.

That part of the earth surrounding the plant and covered by the tile retains its moisture, as it is protected from the sun's rays.

The tile can be used as a curbing for walks, or as a curbing and plant-protector at the same time, the plants along the edges of the walks being protected by the tiles. The earth below the tiles may be raised above the surrounding earth or may have the same level.

Having thus described my invention, I claim as new and desire to secure by Letters Patent—

As an improved article of manufacture, the garden-tile A, having an open bottom and flaring sides, and provided with one or more flaring-necks, B, projecting from the top and communicating with the interior of the tile, as set forth.

LOUIS S. FLATAU.

Witnesses:
F. H. GOODJOHN,
G. W. DAVIS.